United States Patent
Faust

[15] 3,635,524
[45] Jan. 18, 1972

[54] ADJUSTABLE SEAT ESPECIALLY FOR A MOTOR VEHICLE

[72] Inventor: Eberhard Faust, Bernhausen, Germany

[73] Assignee: Recaro Aktiengesellschaft, Glarus, Switzerland

[22] Filed: Mar. 3, 1969

[21] Appl. No.: 803,576

[30] Foreign Application Priority Data

Mar. 13, 1968 Germany..................P 17 53 010.8

[52] U.S. Cl..............................297/284, 297/338, 297/459
[51] Int. Cl...........................................................A47c 3/00
[58] Field of Search..................297/284, 338, 337, 345, 459, 297/458, DIG. 1; 248/396; 297/452

[56] References Cited

UNITED STATES PATENTS

| | | | |
|---|---|---|---|
| 3,161,436 | 12/1964 | Hood | 297/452 X |
| 3,222,109 | 12/1965 | Seward | 297/385 X |
| 3,298,741 | 1/1967 | Lepard | 297/452 X |
| 1,178,214 | 4/1916 | Clark | 297/338 |
| 2,132,331 | 10/1938 | Wanamaker | 297/338 |
| 2,139,028 | 12/1938 | Mensendicck | 297/284 |
| 2,550,811 | 5/1951 | Herbert | 297/338 |
| 2,833,340 | 5/1958 | Shapiro | 297/DIG. 1 |
| 3,288,525 | 11/1966 | Cerf | 297/284 |
| 3,495,871 | 2/1970 | Resag | 297/284 |

FOREIGN PATENTS OR APPLICATIONS 1,236,477 6/1960 France..................297/338

*Primary Examiner*—Francis K. Zugel
*Attorney*—Ernest G. Montague

[57] ABSTRACT

A seat which is adjustable longitudinally to different positions relative to the backrest so as to vary the depth of the seat, and which is also vertically adjustable near its front and rear ends so as to vary its height from the floor and also its inclination in the direction of travel.

5 Claims, 6 Drawing Figures

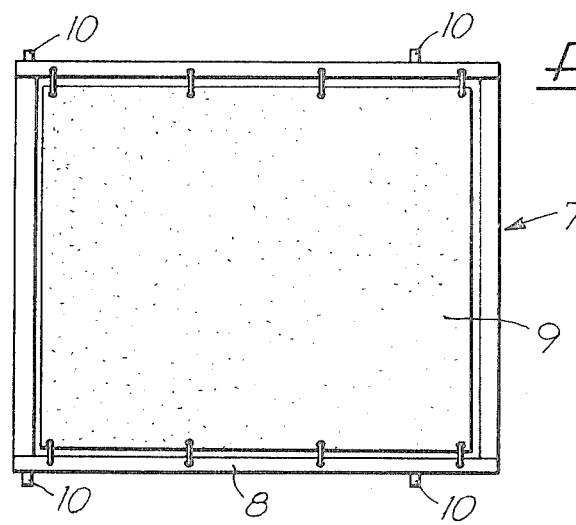
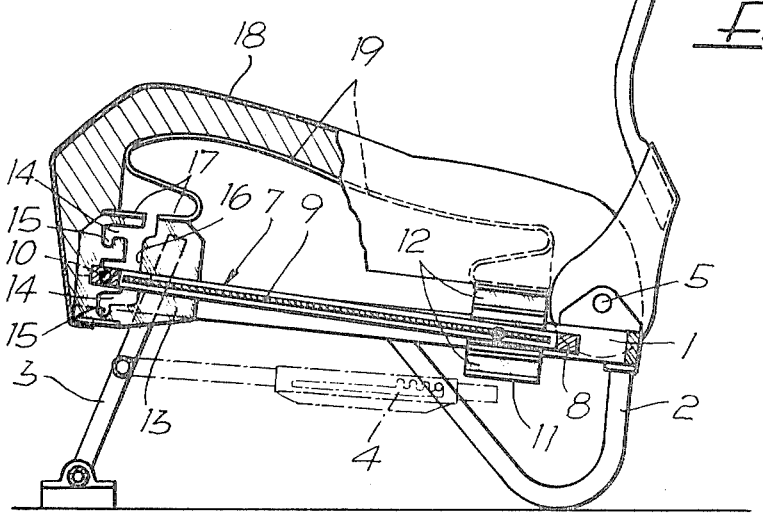

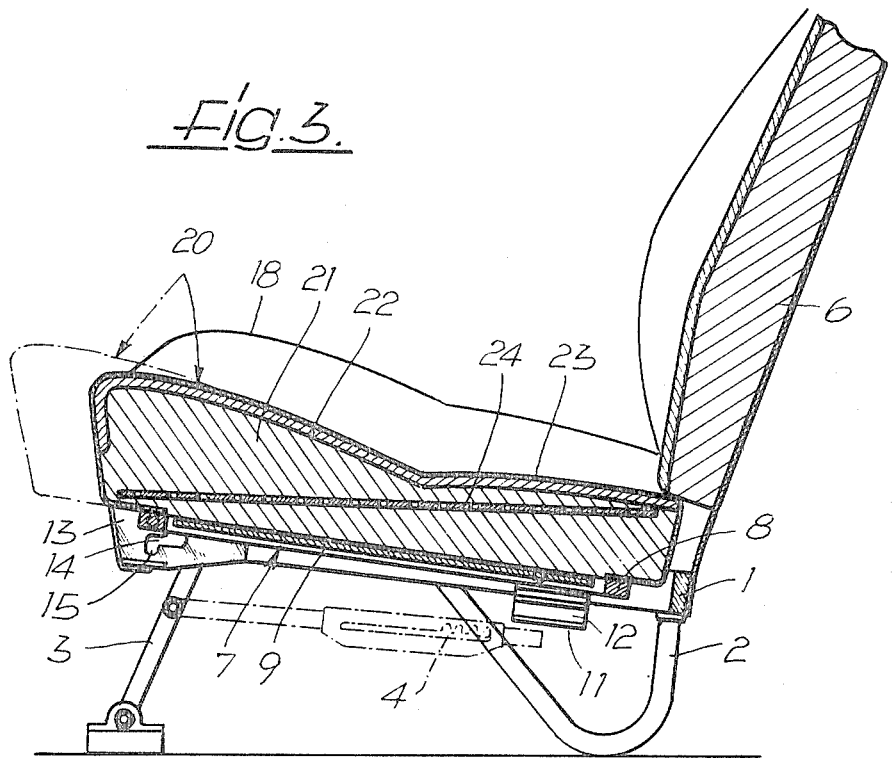
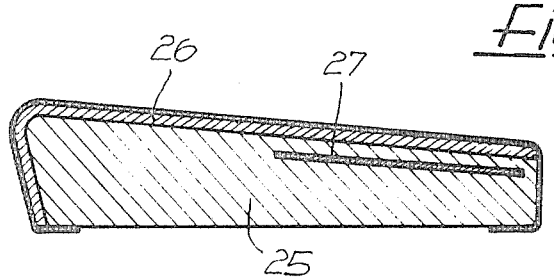

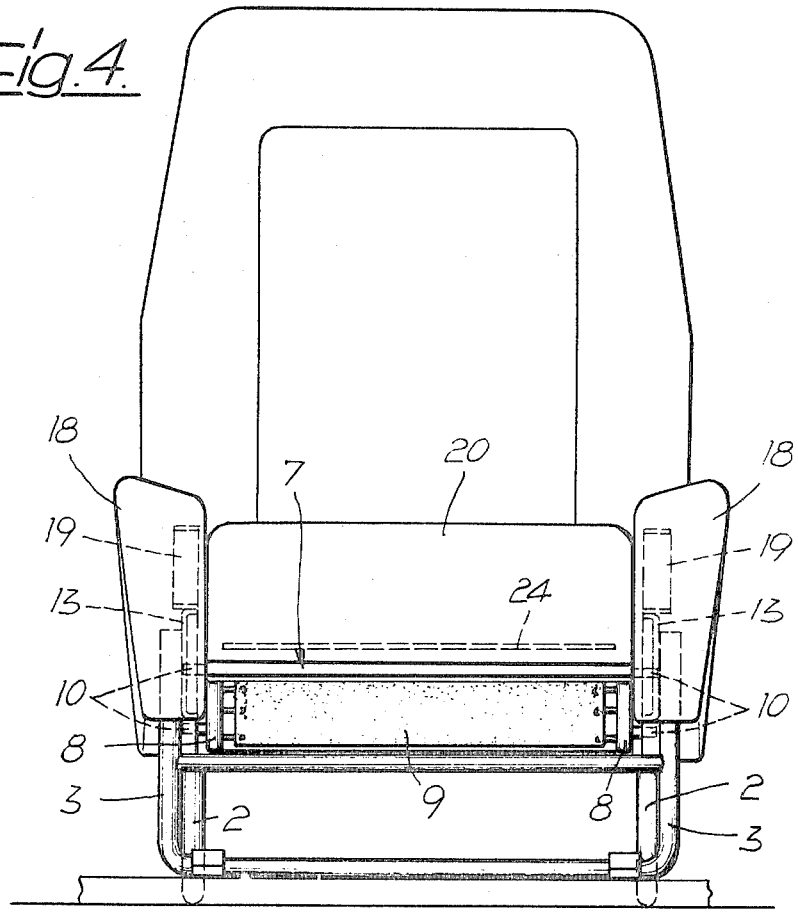
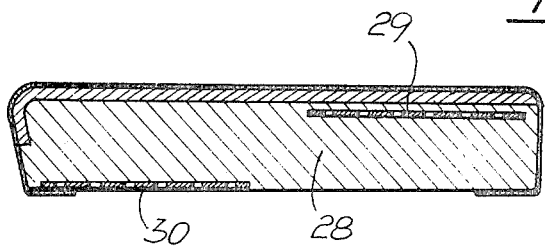

ADJUSTABLE SEAT ESPECIALLY FOR A MOTOR VEHICLE

The present invention relates to a seat, especially for a motor vehicle, which is provided with a seat pad which is adjustable to different levels and inclinations.

A motor-vehicle seat of a construction as disclosed prior to this invention is provided with a support which carries the entire seat pad and is adjustable near its front and rear ends to different levels by being provided on each lateral side near each end with a vertical row of holes. For adjusting the pad support to a different height, a pair of pins provided on the seat frame have to be withdrawn in their axial direction from the pair of holes in which they were previously located and must be inserted into the pair which determines the newly desired seat level. Such insertion requires, however, the seat pad first to be adjusted to the position in which the pins are in accurate alignment with the respective holes. This renders the adjusting operation rather difficult. Furthermore, the unsightly appearance of the rows of holes which are at least partly visible from the outside, for example, when a door of a car in which such a seat is used is opened spoils the appearance of a more elegant car. Usually it will, however, be regarded as the most important disadvantage of the known seat constructions which permit the seat pad to be adjusted to different levels and inclinations that the depth of the seat, i.e., its effective length in the driving direction, is not adjustable in accordance with the different length of the thighs of different persons.

Although for adjusting the depth of a seat it is known to design the backrest so as to be adjustable to different positions in the longitudinal direction of the seat, these constructions are generally too complicated and expensive for lower priced cars.

It is an object of the present invention to provide a seat, especially for a motor vehicle, which is adjustable very easily and by very simple means so as to ensure the best possible support of the body of any person sitting thereon, and the appearance of which is not harmed by the provision of the adjusting means.

According to the invention, this object is attained by providing a seat pad support on which at least the main central part of the seat pad is slidable longitudinally and which is mounted on a seat frame so as to permit it to be adjusted to different levels relative to the floor of the vehicle near its front end and also near its rear end.

The seat pad support according to the invention permits the seat pad resting thereon to be easily shifted in its longitudinal direction. In combination with the adjustability of the seat pad to different levels and inclinations this possibility of shifting this pad to different positions permits the seat to be adjusted to the position which is the most suitable for the dimensions of the body of the particular person using the seat and also the most suitable to permit such a person to carry out the necessary functions, for example, of driving a car, as easily as possible. The pad support according to the invention may further be mounted on the main seat frame by means of a very simple and reliable adjusting device which permits the height of the seat from the floor to be easily adjusted and which is not visible from the outside and therefore does not harm the nice appearance of the seat.

According to one preferred embodiment of the invention, a pad support is employed which is provided on each of its two lateral sides near its front and rear ends with a laterally projecting stud. For supporting the two rear studs, the main seat frame is provided with a pair of rear bearing elements in each of which several grooves are provided which are open at least at one end and extend in the longitudinal direction of the seat and are disposed above each other. For supporting the two front studs, the seat frame carries a pair of front bearing elements each of which is provided with several guide slots which likewise extend in the longitudinal direction of the seat and above each other and each of which terminates at one end into a downwardly extending locking recess, while at the other end all of these guide slots are connected by a substantially vertical slot with each other and through its open upper end with a longitudinal slide track. The longitudinal guide slots in the front bearing element are shorter and the longitudinal slide track on the upper side of this bearing element is longer than the guide grooves in the rear bearing element. Therefore, the rear part of the pad may only be adjusted to a different level, that is, to one in which the rear studs on the pad support are located in another groove of the rear bearing element, when the two front studs are lifted out of the substantially vertical connecting slot and are slidable along the longitudinal slide track.

Another feature of the invention consists in supporting the body of the person using the seat at both sides of the actual seat pad by means of an upwardly projecting lateral pad which may be rigidly connected either to the pad support or to the main seat frame. Although such lateral pads are known as such for giving the person using the seat, for example, of a car, a certain lateral support when driving along curves, they usually do not form any elements separate from the actual seat pad. By dividing the seat pad into three separate elements, namely, the central pad and the two lateral pads, the lateral pads may be secured to the seat frame which has the advantage that, if the sides of the lateral pads facing the central pad are outwardly inclined in the upward direction, a vertical adjustment of the central pad will also result in a change of the width of the effective seat surface. The adjustability merely of the central seat pad in the longitudinal direction along the pad support does not require any increase in the cost of production and it has the additional advantage that during such an adjustment the lateral pads may serve as lateral guides for the central pad.

Since for effecting a vertical adjustment of the seat pad it is only necessary to adjust the pad support in a vertical direction, the seat according to the invention has the further advantage that any vertical adjustment of the height of the seat also results in a change in the height of the backrest. Consequently, a person with a long upper body for whom the seat should be adjusted to a low level will be supported by a long backrest, while the opposite applies if the person has a short upper body. The head of any person using the seat will therefore always be located in substantially the same position which has the advantage that, if the backrest is provided with a special head support, such a support will not require any vertical adjustment. This increases the degree of safety which such a head support or headrest may provide and it also improves its appearance. There is now no longer any need for any visible supporting rods for such a headrest and there is thus also no longer any danger that a person who in an accident is thrown against the backrest might be injured by hitting against such supporting rods.

In order to increase the bracing effect of the lateral pads without rendering it more difficult for a person to pass over these pads when entering or leaving the car, it is another feature of the invention to provide at the inside of each lateral pad a supporting element which very rigidly opposes any pressure acting in a lateral direction upon this pad but is very soft and resilient when subjected to a load from above. Such a supporting element may consist, for example, of a thin leaf spring of a considerable width. Its resilience to a load from above may be made so high without diminishing its rigidity against laterally acting forces that a person sitting down on the lateral pad will hardly notice the presence of this spring since he will then compress the lateral pad down to the level of the main central pad. An additional feature of the invention consists in also making the parts of such a leaf spring which are adjacent to the rigid elements to which they are secured of an extremely high resilience to pressures from above by bending these parts of the spring at least once to a shape similar to the curved part of a hairpin, and to extend the arms of these curved parts substantially in the longitudinal direction of the lateral pad.

Aside from adapting the seat to the bodily dimensions of its user and also aside from bracing such a person laterally, it is of great importance to design the seat so that its surface will afford the best possible and most correct support as seen from a medical standpoint. It is therefore another feature of the invention to provide at least the central part of the seat pad of a padding element in which a sheet or board of a relatively stiff material is embedded within the buttocks area at a relatively short distance from the upper surface of the pad. With such a seat pad it is possible to attain the orthopedically best possible distribution of pressure, the maximum of which will be exerted by the ischia of the hipbone and will diminish from these points toward all sides. In addition, the padding element of the seat pad may be provided with another relatively stiff sheet or board in the front part of the pad on or near its lower side. This second stiff sheet or board renders the front part of the seat pad self-supporting and permits the pad to be shifted forwardly so as to project beyond the pad support if this is desirable in order to increase the depth of the seat.

The features and advantages of the present invention will become further apparent from the following detailed description thereof which is to be read with reference to the accompanying drawings, in which FIG. 1 shows, partly broken away and in section, a side view of a seat according to the invention;

FIG. 2 shows a top view of the pad support of the seat according to FIG. 1;

FIG. 3 shows a central longitudinal section of the seat according to FIG. 1;

FIG. 4 shows a front view of the seat according to FIGS. 1 to 3; while

FIGS. 5 and 6 show longitudinal sections of two different modifications of the seat pad.

As illustrated in the drawings, the support for the seat of a motor vehicle comprises a frame 1 which is provided with feet 2 and 3. The front feet 3 are provided in the form of arms which are pivotably mounted on the floor and are adapted to be adjusted to different positions in each of which they may be locked by a locking device 4. By means of hinge fittings 5 which are not shown in detail, a backrest 6 is pivotably connected to the frame 1 and adapted to be locked in a fixed position.

On the inner side of frame 1, the support 7 of a seat pad is mounted in a manner so as to be adjustable to different levels and inclinations. This pad support 7 which has a smaller width than the frame 1 consists in this particular embodiment of the invention of a frame 8 to which an elastic mat 9 is connected so as to be stretched out tightly at the inner side thereof. In place of such an elastic mat it is also possible to connect elastic straps or a semielastic element, for example, a wire netting, to the frame 8. This element 9 may, however, also be nonelastic and consist, for example, of a plate or shell.

Near its front and rear ends, frame 8 is further provided on two opposite sides with laterally projecting studs 10.

For supporting the rear studs 10 and for adjusting them to different positions in a vertical direction, frame 1 is provided near the rear end of each of these sides with a bearing plate 11. Each of these bearing plates 11 is provided on its side facing the inside of frame 1 with grooves 12 which are disposed above each other and extend in the longitudinal direction of the frame and have open ends. Each of these grooves 12 has a width so as to permit the associated stud 10 to be guided by and slidable along its sidewalls.

Each of the same sides of frame 1 carrying one of the bearing plates 11 also carries on its front end a vertical bearing plate 13. For supporting the front studs 10 of the pad support 7, each of these bearing plates 13 which are welded to frame 1 is provided with several guide slots 14 above and spaced from each other and extending in the longitudinal direction of frame 1. At its front end, the lower wall of each of these slots 14 terminates into a locking recess 15, while at their rear ends, these slots are connected with each other by a substantially vertical slot 16. As shown in FIG. 1, this connecting slot 16 has an open upper end which is offset to the rear of the lower main part of this slot 16 and terminates into an upper guide surface 17 which has a greater length than the guide slots 14.

For changing the level of the front end of the pad support 7 and for thus also changing the inclination of the latter, this front end must first be slightly lifted so as to disengage its two front studs 10 from the locking recesses 15 in bearing plates 13 in which they are normally located so as to prevent any undesired movement of the pad support 7 in its longitudinal direction. After lifting its front end, the pad support 7 may be shifted toward the rear until the front studs 10 enter the substantially vertical connecting slots 16 in bearing plates 13 in which they may then be raised or lowered to the level of another guide slot 14 in each plate 13. The pad support is then again shifted forwardly until the front studs 10 engage into the recesses 15 at the front ends of these newly selected guide slots 14. Guide slots 14 in bearing plates 13 are made so much shorter than the grooves 12 in bearing plates 11 that when the pad support 7 is shifted in the manner as described, the rear studs 10 cannot slide out of the front or rear ends of the respective grooves 12 in which they are located. If the pad support 7 should also be adjusted to a different level at its rear end, the front studs 10 must first be lifted out of the offset upper ends of the connecting slots 16 and placed upon the guide surface 17. The pad support 7 may then be shifted so far forwardly or toward the rear until the rear studs 10 will slide out of the respective grooves 12. After the rear studs 10 have then been inserted into the corresponding pair of grooves 12 at a different level, the front studs 10 may be reinserted into the open ends of slots 16 of bearing plates 13 and then into the associated slots 14 at the desired level.

On each of the two longitudinal arms of frame 1 a relatively high lateral pad 18 is secured. As shown in FIG. 4, the inner surfaces of these lateral pads 18 extend along the inner surfaces of the lateral arms of the pad support 7. Furthermore, the inner surface of each of these pads 18 extends first vertically upward from its lower end. Only approximately the last quarter of the height of each lateral pad 18 is curved and extends outwardly and upwardly. The outer surfaces of pads 18 project beyond the bearing plates 11 and 13 which therefore are completely covered by the material of these pads. Each lateral pad further contains a thin wide leaf spring 19 which is spaced at a relatively short distance from the upper side of the pad and extends substantially parallel thereto in the longitudinal direction. Near the front and rear ends of each lateral pad 18 this leaf spring 19 has a section which is bent back like a hairpin and is followed by a similar section which is bent in the opposite direction and secured to the bearing plate 11 or 13, respectively. Both ends of the leaf spring 19 therefore have an S-shaped curvature. Due to its great width, each leaf spring 19 has a considerable strength to resist pressures which are exerted upon the inner side of the respective lateral pads 18. The flexibility of this spring to pressures from above as occur, for example, when a person sits down on the lateral pad is, however, very high because of the small thickness of this spring and the S-shaped curvature of its opposite ends. Of course, in place of a leaf spring it is also possible to employ, for example, a zigzag-shaped spring which extends longitudinally in a similar manner as leaf spring 19. The upper sides and partly also the lateral sides of each leaf spring 19 are surrounded by a padding of foam plastic which is recessed so as not to cover the guide slots 14, and grooves 12 at the sides of pads 18 facing the pad support 7.

Fitted between the lateral pads 18, a seat pad 20 is supported on the upper side of the pad support 7. This seat pad 20 may be pushed toward the rear until it abuts against the rear side of frame 1 and toward the front until its rear edge is substantially in vertical alignment with the rear sides of the pelvis of a person sitting on this pad. The lateral pads 18 prevent the seat pad 20 from shifting transversely and form lateral guide surfaces for the seat pad when the latter is shifted in its longitudinal direction. When a person sits on the seat pad 20, his or her weight will press the pad firmly upon the pad support 7 so that its lower surface will adapt itself to any uneven surfaces of this support and thereby lock the seat pad to the support and prevent it from shifting it its longitudinal direction. In order to increase this locking effect transverse ridges or grooves or other projections or recesses may be additionally provided on or in the upper surfaces of the pad support 7, although normally the friction between the seat pad and the pad support which is increased by the weight of a person sitting on the seat will render the locking effect quite sufficient.

Since the distance between the upper parts of the lateral pads 18 increases in the upward direction, a vertical adjustment of the seat pad 20 may also result in a change in the width of the available seat surface. Thus, while only the seat pad itself will be available for sitting when it is adjusted to a low position, the two lateral pads will also form a part of the seat surface and increase its width accordingly when the seat pad is adjusted to its highest position.

The seat pad 20 comprises a body 21 which may consist, for example, of foam rubber or foam plastic, a cotton-wool layer 22 covering at least the upper surface of this body 21, and a cover material 23 covering the upper, front, rear and lateral sides of the entire seat pad. The upper side of the seat pad 20 is provided at a distance from its rear edge which is equal to approximately one-third of its entire length with a transverse kink. From this kink the thickness of the pad increases slightly toward the rear and more highly toward the front, so that the rear part of its surface is then nearly flat, while the front part is slightly curved. A relatively stiff sheet 24 of hard fiberboard, plastic, reinforced cardboard or a similar material which may be of a flat shape as shown in the drawings, but may also be corrugated or of any other suitable shape extends from a line near the rear end of the seat pad to a line near its front end. As illustrated in FIG. 3, up to a point underneath the kink in the upper surface of the seat pad this sheet or board extends substantially parallel to end at a relatively short distance from this upper surface, while subsequent to the kink its distance from the upper surface gradually increases toward the front end of the seat pad. The front end of this sheet or board 24 terminates near the front end of the pad body 21 substantially at the lower side of this body.

Within the buttocks area of a person sitting on the seat pad, this sheet or board 24 ensures a very good distribution of pressure which permits this person to sit on this pad for a long time without tiring, while within the area of the seat pad supporting the thighs, this board 24 renders the seat pad self-supporting and thus permits the latter to be shifted forwardly beyond the front edge of the pad support 7, as indicated in FIG. 3 in dot-and-dash lines. The sheet or board 24 may be perforated which improves its adhesion to the pad body and increases the permeability of the pad to air.

As illustrated in FIG. 5, the seat pad may also be made without a transverse kink. The pad body 25 is of a wedge-shaped cross section, increasing in thickness toward the front. In this embodiment of the invention, a stiff sheet or board 27 is embedded in the pad body only within the actual sitting area of the pad and spaced at a small distance from the upper surface of the pad body which is covered with a cotton-wool layer 26.

FIG. 6 illustrates a further modification of the seat pad which has a pad body 28 of a uniform thickness along its entire length and contains within the actual sitting area and at a short distance from its upper surface a stiff perforated sheet or board 29, and a similar sheet 30 connected to the lower side of the thigh area of the pad body 28 for rendering this area self-supporting.

Although my invention has been illustrated and described with reference to the preferred embodiments thereof, I wish to have it understood that it is in no way limited to the details of such embodiments but is capable of numerous modifications within the scope of the appended claims.

I claim:

1. A seat having a supporting frame adapted to be mounted on a floor, a seat pad, a pad support within said frame, said seat pad having at least a central part slidable longitudinally on said pad support to different positions relative to said pad support, and associated means on said frame and said pad support for adjusting said pad support together with at least said central part of said pad in a substantially vertical direction near the front end and also near the rear end of said pad support relative to said frame so as to permit the height of said pad from the floor and, if desired, also its inclination relative to said floor to be adjusted to different positions, said pad support having a pair of front studs and a pair of rear studs projecting laterally to the outside of the opposite longitudinal sides of said support near its front and rear ends for supporting said pad support on said frame, a pair of rear lateral bearing elements and a pair of front lateral bearing elements secured to said frame, each of said rear bearing elements having a plurality of grooves above each other and extending substantially in the longitudinal direction of said seat and being open at least at one end, said rear studs projecting into and being slidable in the corresponding grooves of said rear bearing elements, each of said front bearing elements having a plurality of guide tracks above each other and also extending substantially in said longitudinal direction, each of said guide tracks of both front bearing elements having a downwardly extending locking recess at one end, and a substantially vertical connecting track connecting the other ends of said guide tracks of each front bearing element to each other and terminating at its upper end into a longitudinal slide track, each of said grooves in said rear bearing elements having a greater length than each of said guide tracks, and each of said slide tracks having a greater length than each of said grooves, said front studs being adapted to slide along said slide tracks of said front bearing elements when said rear studs are to be withdrawn from a corresponding pair of grooves at one level in said rear bearing elements and are to be inserted into a corresponding pair of grooves at another level, said front studs being further adapted to be thereafter inserted into said vertical connecting tracks and then into any pair of corresponding guide tracks of said front bearing elements and to be moved along the same until they engage into said locking recesses of said guide tracks.

2. A seat as defined in claim 1, in which in the rear part of at least said central part of said seat pad a relatively stiff plate is embedded and spaced at a small distance from the upper surface of said central part.

3. A seat as defined in claim 2, in which the front part of at least said central part of said seat pad is supported by a relatively stiff plate mounted thereon near the lower side of said central part.

4. A seat as defined in claim 3, in which at least one of said plates is perforated.

5. A seat as defined in claim 1, in which the upper side of at least said central part of said seat pad has a transverse kink, and a relatively stiff flat plate embedded in said central part and extending from a line near the rear end to a line near the front end of said central part.

* * * * *